US011891526B2

(12) United States Patent
Patton et al.

(10) Patent No.: US 11,891,526 B2
(45) Date of Patent: Feb. 6, 2024

(54) INK COMPOSITION FOR COSMETIC CONTACT LENSES

(71) Applicant: Johnson & Johnson Vision Care, Inc., Jacksonville, FL (US)

(72) Inventors: Jaqunda Patton, Jacksonville, FL (US); Yong Zhang, Jacksonville, FL (US); Alexander Guzman, Jacksonville, FL (US); Ghulam Maharvi, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 591 days.

(21) Appl. No.: 16/987,673

(22) Filed: Aug. 7, 2020

(65) Prior Publication Data
US 2021/0079238 A1 Mar. 18, 2021

Related U.S. Application Data

(60) Provisional application No. 62/899,311, filed on Sep. 12, 2019.

(51) Int. Cl.
| | | |
|---|---|---|
| G02C 7/04 | (2006.01) |
| C09D 11/037 | (2014.01) |
| C08K 3/013 | (2018.01) |
| C08F 220/20 | (2006.01) |
| C08G 77/20 | (2006.01) |
| C08G 77/26 | (2006.01) |
| C08G 77/28 | (2006.01) |
| C08K 5/00 | (2006.01) |
| C08L 39/06 | (2006.01) |
| C08L 77/00 | (2006.01) |
| C08L 83/06 | (2006.01) |
| C09D 11/102 | (2014.01) |
| C09D 11/107 | (2014.01) |

(52) U.S. Cl.
CPC .......... *C09D 11/037* (2013.01); *C08F 220/20* (2013.01); *C08G 77/20* (2013.01); *C08G 77/26* (2013.01); *C08G 77/28* (2013.01); *C08K 3/013* (2018.01); *C08K 5/0041* (2013.01); *C08L 39/06* (2013.01); *C08L 77/00* (2013.01); *C08L 83/06* (2013.01); *C09D 11/102* (2013.01); *C09D 11/107* (2013.01); *G02C 7/04* (2013.01)

(58) Field of Classification Search
CPC ... C09D 11/033; C09D 11/037; C09D 11/102; C09D 11/107; C09D 11/10; C09D 11/106; C08F 220/20; C08G 77/20; C08G 77/26; C08G 77/28; C08K 3/013; C08K 5/0041; C08L 39/06; C08L 77/00; C08L 83/06; G02C 7/04; G02C 7/049; B29D 11/00048; B29D 11/00134; B29L 2011/0041; G02B 1/043
USPC .................................................... 351/159.02
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,808,178 A | 4/1974 | Gaylord |
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,197,266 A | 4/1980 | Clark et al. |
| 4,414,372 A | 11/1983 | Farnham et al. |
| 4,417,034 A | 11/1983 | Webster |
| 4,436,887 A | 3/1984 | Chromecek et al. |
| 4,495,313 A | 1/1985 | Larsen |
| 4,508,880 A | 4/1985 | Webster |
| 4,524,196 A | 6/1985 | Farnham et al. |
| 4,581,428 A | 4/1986 | Farnham et al. |
| 4,659,782 A | 4/1987 | Spinelli |
| 4,659,783 A | 4/1987 | Spinelli |
| 4,740,533 A | 4/1988 | Su et al. |
| 4,771,116 A | 9/1988 | Citron |
| 4,889,664 A | 12/1989 | Kindt-Larsen et al. |
| 4,910,277 A | 3/1990 | Bambury et al. |
| 4,981,903 A | 1/1991 | Garbe et al. |
| 5,006,622 A | 4/1991 | Kunzier et al. |
| 5,034,461 A | 7/1991 | Lai et al. |
| 5,039,459 A | 8/1991 | Kindt-Larsen et al. |
| 5,057,578 A | 10/1991 | Spinelli |
| 5,070,215 A | 12/1991 | Bambury et al. |
| 5,164,452 A | 11/1992 | Tone et al. |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |

(Continued)

FOREIGN PATENT DOCUMENTS

| | | |
|---|---|---|
| CN | 1647033 A | 4/2007 |
| CN | 103865067 A | 6/2014 |

(Continued)

OTHER PUBLICATIONS

PCT International Search Report, dated Sep. 18, 2020, for PCT Int'l Appln. No. PCT/IB2020/057842.

(Continued)

*Primary Examiner* — William R Alexander
(74) *Attorney, Agent, or Firm* — Raef M. Shaltout

(57) ABSTRACT

Provided are ink compositions for making cosmetic contact lenses, as well as cosmetic contact lenses and methods for their preparation and use. The ink composition comprises: (a) a colorant; and (b) a nonreactive hydrophilic polymer.

28 Claims, No Drawings

(56) References Cited

U.S. PATENT DOCUMENTS

| | | | |
|---|---|---|---|
| 5,314,960 A | 5/1994 | Spinelli et al. | |
| 5,321,108 A | 6/1994 | Kunzler et al. | |
| 5,331,067 A | 7/1994 | Seidner et al. | |
| 5,371,147 A | 12/1994 | Spinelli et al. | |
| 5,387,662 A | 2/1995 | Kunzler et al. | |
| 5,539,016 A | 7/1996 | Kunzler et al. | |
| 5,733,971 A | 3/1998 | Feldmann-Krane et al. | |
| 5,760,100 A | 6/1998 | Nicolson et al. | |
| 5,776,999 A | 7/1998 | Nicolson et al. | |
| 5,789,461 A | 8/1998 | Nicolson et al. | |
| 5,824,719 A | 10/1998 | Kunzler et al. | |
| 5,849,811 A | 12/1998 | Nicolson et al. | |
| 5,944,853 A | 8/1999 | Molock et al. | |
| 5,962,548 A | 10/1999 | Vanderlaan et al. | |
| 5,965,631 A | 10/1999 | Nicolson et al. | |
| 5,998,498 A | 12/1999 | Vanderlaan et al. | |
| 6,020,445 A | 2/2000 | Vanderlaan et al. | |
| 6,087,415 A | 7/2000 | Vanderlaan et al. | |
| 6,284,161 B1 * | 9/2001 | Thakrar | G02C 7/108 264/2.6 |
| 6,367,929 B1 | 4/2002 | Maiden et al. | |
| 6,414,049 B1 | 7/2002 | Alli et al. | |
| 6,420,453 B1 | 7/2002 | Bowers et al. | |
| 6,423,761 B1 | 7/2002 | Bowers et al. | |
| 6,551,531 B1 | 4/2003 | Ford et al. | |
| 6,767,979 B1 | 7/2004 | Muir et al. | |
| 6,822,016 B2 | 11/2004 | McCabe et al. | |
| 6,867,245 B2 | 3/2005 | Iwata et al. | |
| 6,943,203 B2 | 9/2005 | Vanderlaan et al. | |
| 6,951,894 B1 | 10/2005 | Nicolson et al. | |
| 7,052,131 B2 | 5/2006 | McCabe et al. | |
| 7,247,692 B2 | 7/2007 | Laredo | |
| 7,249,848 B2 | 7/2007 | Laredo et al. | |
| 7,276,569 B2 | 10/2007 | Yamago et al. | |
| 7,291,690 B2 | 11/2007 | Yamago et al. | |
| 7,396,890 B2 | 7/2008 | Zanini et al. | |
| 7,461,937 B2 | 12/2008 | STeffen et al. | |
| 7,468,398 B2 | 12/2008 | Nicolson et al. | |
| 7,473,735 B2 | 1/2009 | Uchiumi et al. | |
| 7,538,146 B2 | 5/2009 | Nicolson et al. | |
| 7,553,880 B2 | 6/2009 | Nicolson et al. | |
| 7,572,841 B2 | 8/2009 | Chen et al. | |
| 7,615,601 B2 | 11/2009 | Yamago et al. | |
| 7,662,899 B2 | 2/2010 | Yamago et al. | |
| 7,666,921 B2 | 2/2010 | McCabe et al. | |
| 7,691,916 B2 | 4/2010 | McCabe et al. | |
| 7,786,185 B2 | 8/2010 | Rathore et al. | |
| 7,825,170 B2 | 11/2010 | Steffen et al. | |
| 7,879,444 B2 | 2/2011 | Jiang et al. | |
| 7,915,323 B2 | 3/2011 | Awasthi et al. | |
| 7,934,830 B2 | 5/2011 | Blackwell et al. | |
| 7,956,131 B2 | 6/2011 | Arnold et al. | |
| 7,994,356 B2 | 8/2011 | Awasthi et al. | |
| 8,022,158 B2 | 9/2011 | Rathore et al. | |
| 8,138,290 B2 | 3/2012 | Blackwell et al. | |
| 8,163,206 B2 | 4/2012 | Chang et al. | |
| 8,273,802 B2 | 9/2012 | Laredo et al. | |
| 8,389,597 B2 | 3/2013 | Blackwell et al. | |
| 8,399,538 B2 | 3/2013 | Steffen et al. | |
| 8,415,404 B2 | 4/2013 | Nicolson et al. | |
| 8,415,405 B2 | 4/2013 | Maggio et al. | |
| 8,420,711 B2 | 4/2013 | Awasthi et al. | |
| 8,450,387 B2 | 5/2013 | McCabe et al. | |
| 8,470,906 B2 | 6/2013 | Rathore et al. | |
| 8,487,058 B2 | 7/2013 | Liu et al. | |
| 8,507,577 B2 | 8/2013 | Zanini et al. | |
| 8,524,800 B2 | 9/2013 | Phelan | |
| 8,545,983 B2 | 10/2013 | Jiang et al. | |
| 8,568,626 B2 | 10/2013 | Nicolson et al. | |
| 8,637,621 B2 | 1/2014 | Iwata et al. | |
| 8,653,175 B2 | 2/2014 | Yamago et al. | |
| 8,662,663 B2 | 3/2014 | Matsushita et al. | |
| 8,686,099 B2 | 4/2014 | Guyer et al. | |
| 8,703,891 B2 | 4/2014 | Broad | |
| 8,772,367 B2 | 7/2014 | Saxena et al. | |
| 8,772,422 B2 | 7/2014 | Saxena et al. | |
| 8,835,583 B2 | 9/2014 | Saxena et al. | |
| 8,835,671 B2 | 9/2014 | Jiang et al. | |
| 8,870,372 B2 | 10/2014 | Li et al. | |
| 8,940,812 B2 | 1/2015 | Reboul et al. | |
| 8,974,775 B2 | 3/2015 | Saxena et al. | |
| 8,980,972 B2 | 3/2015 | Driver | |
| 9,056,878 B2 | 6/2015 | Fujisawa et al. | |
| 9,057,821 B2 | 6/2015 | Broad et al. | |
| 9,170,349 B2 | 10/2015 | Mahadevan et al. | |
| 9,200,119 B2 | 12/2015 | Phukan et al. | |
| 9,217,813 B2 | 12/2015 | Liu et al. | |
| 9,244,196 B2 | 1/2016 | Scales et al. | |
| 9,255,199 B2 | 2/2016 | Guyer et al. | |
| 9,260,544 B2 | 2/2016 | Rathore et al. | |
| 9,296,764 B2 | 3/2016 | Bhat et al. | |
| 9,297,928 B2 | 3/2016 | Molock et al. | |
| 9,297,929 B2 | 3/2016 | Scales et al. | |
| 10,589,479 B2 | 3/2020 | Tucker et al. | |
| 10,676,575 B2 | 6/2020 | Zhang et al. | |
| 11,034,107 B2 | 6/2021 | Lai et al. | |
| 2001/0049400 A1 | 12/2001 | Alli et al. | |
| 2002/0016383 A1 | 2/2002 | Iwata et al. | |
| 2002/0099112 A1 | 7/2002 | Turner et al. | |
| 2002/0107324 A1 | 8/2002 | Vanderlaan et al. | |
| 2002/0133889 A1 | 9/2002 | Molock et al. | |
| 2002/0151619 A1 | 10/2002 | Lin | |
| 2003/0035083 A1 * | 2/2003 | Francis | B29D 11/00923 351/159.02 |
| 2003/0052424 A1 | 3/2003 | Turner et al. | |
| 2004/0130676 A1 | 7/2004 | Doshi et al. | |
| 2004/0209973 A1 | 10/2004 | Steffen et al. | |
| 2005/0218536 A1 | 10/2005 | Quinn et al. | |
| 2006/0007391 A1 | 1/2006 | McCabe et al. | |
| 2008/0102122 A1 | 5/2008 | Mahadevan et al. | |
| 2008/0143003 A1 | 6/2008 | Phelan | |
| 2009/0244479 A1 | 10/2009 | Zanini et al. | |
| 2010/0048847 A1 | 2/2010 | Broad | |
| 2010/0069522 A1 | 3/2010 | Linhardt et al. | |
| 2010/0099829 A1 | 4/2010 | Parakka | |
| 2012/0083573 A1 | 4/2012 | Parakka et al. | |
| 2013/0155370 A1 | 6/2013 | Zhang | |
| 2013/0168617 A1 | 7/2013 | Alli et al. | |
| 2013/0172440 A1 | 7/2013 | Alli et al. | |
| 2013/0217620 A1 | 8/2013 | Alli et al. | |
| 2014/0024791 A1 | 1/2014 | Alli et al. | |
| 2014/0031447 A1 | 1/2014 | Alli et al. | |
| 2015/0094395 A1 | 4/2015 | Alli et al. | |
| 2016/0315347 A1 | 10/2016 | Li et al. | |
| 2017/0183520 A1 * | 6/2017 | Breitkopf | B29D 11/00923 |
| 2017/0276959 A1 * | 9/2017 | Bowers | G02C 7/049 |
| 2018/0079157 A1 * | 3/2018 | Tucker | B29D 11/00317 |
| 2018/0100039 A1 | 4/2018 | Zhang et al. | |
| 2018/0173008 A1 * | 6/2018 | Flitsch | B29D 11/00038 |
| 2018/0267334 A1 * | 9/2018 | Chien | C08J 7/042 |
| 2019/0293960 A1 | 9/2019 | Patton et al. | |

FOREIGN PATENT DOCUMENTS

| | | |
|---|---|---|
| EP | 0080539 B1 | 6/1983 |
| EP | 0344692 A2 | 12/1989 |
| EP | 0632329 A1 | 1/1995 |
| EP | 1735643 | 12/2006 |
| EP | 1541592 B1 | 5/2007 |
| EP | 1541550 B1 | 10/2008 |
| EP | 1595894 B1 | 10/2011 |
| EP | 1619211 B1 | 10/2012 |
| EP | 3121643 B1 | 7/2020 |
| EP | 2681615 B1 | 12/2021 |
| JP | 2008220944 A | 9/2008 |
| KR | 100910403 B1 | 8/2009 |
| RU | 2334770 C1 | 9/2008 |
| TW | 201410719 A | 3/2014 |
| WO | 1996021167 A1 | 7/1996 |
| WO | 96/31792 A1 | 10/1996 |
| WO | 2003022321 A2 | 3/2003 |
| WO | 2003068848 A2 | 8/2003 |
| WO | 2006039467 A2 | 4/2006 |
| WO | 2008061992 A2 | 5/2008 |

(56) References Cited

FOREIGN PATENT DOCUMENTS

| WO | 2008112874 A1 | 9/2008 |
|---|---|---|
| WO | 2011034801 A1 | 3/2011 |
| WO | 2013177523 A2 | 11/2013 |
| WO | 2014123959 A1 | 8/2014 |
| WO | 2018067284 A1 | 4/2018 |

OTHER PUBLICATIONS

PCT International Preliminary Report on Patentability, dated Sep. 29, 2020, for PCT Int'l Appln. No. PCT/US2019/052187.
Bas et al, Synthesis, Characterization and properties of amphiphilic block copolymers of 2-hydroxyethyl methacrylate and polydimethylsiloxane prepared by atom transfer radical polymerization, Polymer Journal, 2012, vol. 44, pp. 1087-1097.
Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.
Crivello, et al, Photoinitiators for Free Radical Cationic & Anionic Photopolymerisation, 2nd Edition, vol. III, pp. 275-298, John Wiley and Sons, New York, 1998.
Goto et al, Mechanism-Based Invention of High-Speed Living Radical Polymerization Using Organotellurium Compounds and Azo-Initiators, Journal of the American Chemical Society, (2003), vol. 125, pp. 8720-8721.
Hawker et al, New polymer synthesis by nitroxide mediated living radical polymerizations, Chem. Rev. 2001, vol. 101, No. 12, pp. 3661-3688.
Hou et al., Synthesis and Surface Analysis of Siloxane-Containing Amphiphilic Graft Copolymers, Poly(2-hydroxyethyl methacrylate-g-dimethylsiloxane) and Poly(2,3-dihydroxypropyl methacrylate-g-dimethylsiloxane), Macromolecules (2002), vol. 35, pp. 5953-5962.
ISO 18369-4:2006: Ophthalmic optics—Contact lenses—Part 4: Physicochemical properties of contact lens materials.
ISO 9913-1: 1996: Optics and optical instruments—Contact Lenses—Part 1: Determination of oxygen permeability and transmissibility by the FATT method.
Kamigaito et al, Metal-catalyzed living radical polymerization, Chem. Rev. 2001, vol. 101, No. 12, pp. 3689-3745.
Matyjaszewski et al, Atom transfer radical polymerization, Chem. Rev. 2001, vol. 101, No. 9, pp. 2921-2990.
Mi et al., pH responsive properties of non-fouling mixed-charge polymer brushes based on quaternary amine and carboxylic acid monomers, Biomaterials (2010), vol. 31, pp. 2919-2925.
Moad et al, Toward living radical polymerization, Accounts of Chemical Research, vol. 41, No. 9, Sep. 2008, pp. 1133-1142.
Nakamura et al., Organotellurium-mediated living radical polymerization under photoirradiation by a low-intensity light-emitting diode, Beilstein Journal of Organic Chemistry, (2013), vol. 9, pp. 1607-1612.
Nakamura et al., Photoinduced Switching from Living Radical Polymerization to a Radical Coupling Reaction Mediated by Organotellurium Compounds, Journal of the American Chemical Society, (2012), vol. 134, pp. 5536-5539.
Ouchi et al, Transition metal-catalyzed living radical polymerization: toward perfection in catalysis and precision polymer synthesis, Chem. Rev. 2009, vol. 109, No. 11, pp. 4963-5050.
PCT International Preliminary Report on Patentability, dated Apr. 9, 2019, for PCT Int'l Appin. No. PCT/US2017/051456.
PCT International Search Report, dated Jul. 8, 2019, for PCT Int'l Appin. No. PCT/IB2019/052187.
PCT International Search Report, dated Nov. 30, 2017, for PCT Int'l Appin. No. PCT/US2017/051456.
Pouget et al, Well-architectured poly(dimethylsiloxane)-containing copolymers obtained by radical chemistry, Chemical Reviews, 2010, vol. 110, No. 3, pp. 1233-1277.
Shinoda et al, Structural Control of Poly(methyl methacrylate)-g-poly(dimethylsiloxane) Copolymers Using Controlled Radical Polymerization: Effect of the Molecular Structure on Morphology and Mechanical Properties, Macromolecules 2003, vol. 36, No. 13, pp. 4772-4778.
Sogah et al, Group Transfer Polymerization. Polymerization of Acrylic Monomers, Macromolecules, Jul. 1987, 1473-1488, 20(7).
Webster et al, Group-Transfer Polymerization. 1. A New Concept for Addition Polymerization with Organosilicon Initiators, Journal of the American Chemical Society, Aug. 24, 1983, 5706-5708, 105(17).
Webster, Group Transfer Polymerization: Mechanism and Comparison with Other Methods for Controlled Polymerization of Acrylic Monomers, Advanced Polymer Science, (2004) 167:1-34.
Yamago et al., Synthesis of structurally well-controlled x-vinylidene functionalized poly (alkyl methacrylate)s and polymethacrylonitrile by organotellurium, organostibine, and organobismuthine-mediated living radical polymerizations, Reactive & Functional Polymers (2009), vol. 69, pp. 416-423.
Yamago et al., Tailored Synthesis of Structurally Defined Polymers by Organotellurium-Mediated Living Radical Polymerization (TERP): Synthesis of Poly(meth)acrylate Derivatives and Their Di- and Triblock Copolymers, Journal of the American Chemical Society, (2002), vol. 124, pp. 13666-13667.
Yamago, Development of Organotellurium-Mediated and Organostibine-Mediated Living Radical Polymerization Reactions, Journal of Polymer Science: Part A: Polymer Chemistry, vol. 44, pp. 1-12 (2006).
Yamago, Precision polymer synthesis by degenerative transfer controlled/living radical polymerization using organotellurium, organostibine, and organobismuthine chain-transfer agents, Chemical Reviews, 2009, vol. 109, No. 11, pp. 5051-5068.
PCT International Preliminary Report on Patentability, dated Mar. 15, 2022, for PCT Int'l Appln. No. PCT/IB2020/057842.
Sutyagin et al., Chemistry and physics of polymers, Tomsk: TPU Publishing House, 2003, p. 142, (translated).

* cited by examiner

INK COMPOSITION FOR COSMETIC CONTACT LENSES

RELATED APPLICATIONS

This application claims priority to U.S. Provisional Patent Application Ser. No. 62/899,311, filed Sep. 12, 2019, which is incorporated herein by reference in its entirety.

FIELD OF THE INVENTION

The invention relates to cosmetic contact lenses, more specifically to ink compositions that can be used to make cosmetic contact lenses, such as cosmetic silicone hydrogel lenses.

BACKGROUND OF THE INVENTION

The use of tinted hydrogel contact lenses to alter the natural color of the eye for cosmetic purposes is known. Ink compositions employed to produce tinted hydrogel contact lenses are typically composed of a binding polymer and colorants. Known ink compositions for cosmetic lenses are generally designed for conventional (non-silicone) lenses.

In recent years, contact lenses formed from silicone hydrogels have become popular. These contact lenses have higher oxygen permeability than traditional hydrogels. The improved oxygen permeability has reduced the symptoms of hypoxia in contact lens users wearing them. Unfortunately, processes used to produce traditional hydrogel lenses do not work well to consistently produce silicone hydrogel contact lenses. An example of one such process is the production of cosmetic silicone hydrogel contact lenses.

Ink compositions that provide cosmetic contact lenses, such as cosmetic silicone hydrogel contact lenses, without significant smearing or rub-off of the ink, and that are compatible with the base lens material, would be an advance in the art.

SUMMARY OF THE INVENTION

The invention provides ink compositions that contain a colorant, a nonreactive hydrophilic polymer, and optionally a binder polymer. The ink compositions, when used for example with silicone hydrogel contact lenses, provide contact lenses that are round (not distorted) and where the ink, once applied to the lens, does not smear and easily rub-off. The ink compositions, therefore, are well suited for the manufacture of cosmetic contact lenses.

In one aspect, therefore, the invention provides an ink composition for making cosmetic contact lenses. The ink composition comprises: (a) a colorant; and (b) a nonreactive hydrophilic polymer; and optionally (c) a binder polymer. The binder polymer may comprise a polymer formed from at least one hydrophilic monomer comprising functionality selected from the group consisting of hydroxyalkyl, aminoalkyl, and mixtures thereof, at least one silicone-containing macromer; and optionally a silicone-containing monomer.

In another aspect, the invention provides a cosmetic contact lens. The cosmetic contact lens comprises: a contact lens having applied thereon an ink composition as described herein. As is apparent, the cosmetic contact lens may include multiple layers of ink compositions (e.g., 2, 3, or 4 layers) optionally with multiple layers of clear coat, and the compositions of the multiple layers of the ink compositions, including the pigments used, may be the same or different. The cosmetic contact lens may include additional layers thereon, including layers containing pigments but that are free of nonreactive hydrophilic polymer.

In a further aspect, the invention provides a method for making a cosmetic contact lens. The method comprises: (i) applying a clear coat to a lens forming surface of a first lens forming mold; (ii) applying to the clear coat an ink composition as described herein; (iii) optionally repeating step (i), step (ii), or both step (i) and step (ii); (iv) dispensing a lens material to the first lens forming mold; (v) applying a second lens forming mold; and (vi) curing the lens material to form the cosmetic contact lens.

DETAILED DESCRIPTION OF THE INVENTION

It is to be understood that the invention is not limited to the details of construction or process steps set forth in the following description. The invention is capable of other embodiments and of being practiced or being carried out in various ways using the teaching herein.

As noted above, in one aspect, the invention provides ink compositions. The inventors have discovered that ink compositions as described herein can be used to produce cosmetic contact lenses, such as cosmetic silicone hydrogel contact lenses, with favorable properties. For instance, such lenses exhibit low or no haze, which indicates a favorable compatibility between the materials of the ink composition and the materials of the base lens. In addition, the inks exhibit little or no smearing or rub-off of the ink. Further, the ink compositions do not adversely affect the shape of the lenses. The lenses, therefore, generally retain their round shape.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Unless otherwise indicated, ratios, percentages, parts, and the like are by weight.

Unless otherwise indicated, numeric ranges, for instance as in "from 2 to 10," are inclusive of the numbers defining the range (e.g., 2 and 10).

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

Lenses of the present invention may be comprised of silicone hydrogels or conventional hydrogels. Silicone hydrogels typically contain at least one hydrophilic monomer and at least one silicone-containing component that are covalently bound to one another in the cured device.

An ink composition according to the invention comprises: (a) a colorant; and (b) a nonreactive hydrophilic polymer; and optionally (c) a binder polymer.

The colorant for use in the ink compositions of the invention may be any organic or inorganic pigment or dye suitable for use in contact lenses, or combinations of such pigments and/or dyes. The opacity may be controlled by varying the concentration of the colorant in the composition, with higher amounts yielding greater opacity. Illustrative colorants include, without limitation, pthalocyanine blue, pthalocyanine green, carbazole violet, vat orange #1, iron oxide black, iron oxide brown, iron oxide yellow, iron oxide red, titanium dioxide, dichlorotriazine, vinyl sulfone-based dyes, and mixtures of two or more thereof. Useful dyes and pigments are commercially available.

The ink composition of the invention comprises at least one nonreactive hydrophilic polymer. By "nonreactive" is meant that the hydrophilic polymer, when used in the formulation, does not contain free-radical polymerizable groups that are capable of copolymerizing with other constituents in the formulation under the free-radical polymerization conditions described herein. Without wishing to be bound by theory, it is believed that the nonreactive hydrophilic polymer helps to stabilize the colorant within the ink composition.

The nonreactive hydrophilic polymer may be a polyamide. As used herein, the term "polyamide" refers to polymers and copolymers comprising repeating units containing amide groups. The polyamide may comprise cyclic amide groups, acyclic amide groups and combinations thereof. Acyclic polyamides comprise pendant acyclic amide groups. Cyclic polyamides comprise cyclic amide groups.

Examples of suitable acyclic polyamides include polymers and copolymers comprising repeating units of Formulae G1 and G2:

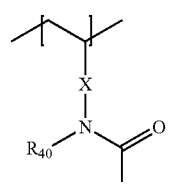

Formula G1

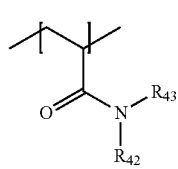

Formula G2 wherein X is a direct bond, —(CO)—, or —(CONHR$_{44}$)—, wherein R$_{44}$ is a C$_1$ to C$_3$ alkyl group; R$_{40}$ is selected from H, straight or branched, substituted or unsubstituted C$_1$ to C$_4$ alkyl groups; R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{42}$ is selected from H, straight or branched, substituted or unsubstituted C$_1$ to C$_4$ alkyl groups; or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted C$_1$ to C$_2$ alkyl groups. X may be a direct bond, and R$_{40}$ and R$_{41}$ may be independently selected from H, substituted or unsubstituted C$_1$ to C$_2$ alkyl groups. R$_{42}$ and R$_{43}$ can be independently selected from H, substituted or unsubstituted C$_1$ to C$_2$ alkyl groups, methyl, ethoxy, hydroxyethyl, and hydroxymethyl.

Acyclic polyamides may comprise a majority of the repeating units of Formula G1 or Formula G2, or the acyclic polyamides can comprise at least 50 mole percent of the repeating unit of Formula G1 or Formula G2, including at least 70 mole percent, and at least 80 mole percent. Specific examples of repeating units of Formula G1 and Formula G2 include repeating units derived from N-vinyl-N-methylacetamide, N-vinylacetamide, N-vinyl-N-methylpropionamide, N-vinyl-N-methyl-2-methylpropionamide, N-vinyl-2-methyl-propionamide, N-vinyl-N,N'-dimethylurea, N,N-dimethylacrylamide, methacrylamide, and acyclic amides of Formulae G3 and G4:

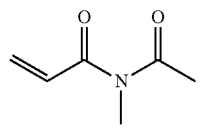

Formula G4

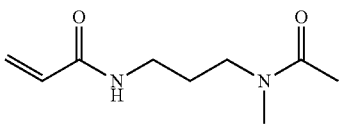

Formula G4

Examples of suitable cyclic amides that can be used to form cyclic polyamides include α-lactam, β-lactam, γ-lactam, δ-lactam, and ε-lactam. Examples of suitable cyclic polyamides include polymers and copolymers comprising repeating units of Formula G5:

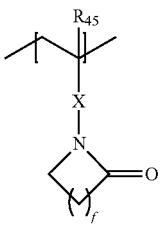

Formula G5 wherein R$_{45}$ is a hydrogen atom or methyl group; wherein f is a number from 1 to 10; wherein X is a direct bond, —(CO)—, or —(CONHR$_{46}$)—, wherein R$_{46}$ is a C$_1$ to C$_3$ alkyl group. In Formula G5, f may be 8 or less, including 7, 6, 5, 4, 3, 2, or 1. In Formula G5, f may be 6 or less, including 5, 4, 3, 2, or 1. In Formula G5, f may be from 2 to 8, including 2, 3, 4, 5, 6, 7, or 8. In Formula G5, f may be 2 or 3. When X is a direct bond, f may be 2. In such instances, the cyclic polyamide may be polyvinylpyrrolidone (PVP).

Cyclic polyamides may comprise 50 mole percent or more of the repeating unit of Formula G5, or the cyclic polyamides can comprise at least 50 mole percent of the repeating unit of Formula G5, including at least 70 mole percent, and at least 80 mole percent.

The polyamides may also be copolymers comprising repeating units of both cyclic and acyclic amides. The polyamides may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a $M_w$ of about 570 KDa).

A preferred nonreactive hydrophilic polymer is PVP. PVP polymers suitable for use in the invention are commercially available or can be readily prepared by those skilled in the art. A preferred commercially available PVP is PVP K30, which has a weight average molecular weight of about 55,000 daltons. Another preferred commercially available PVP is PVP K60, which has a weight average molecular weight of about 400,000 daltons. Further preferred are mixtures of PVP K30 and PVP K60. The PVP K30 and PVP K90 may be used at various weight ratios, for instance at a weight ratio of PVP K30:PVP K90 ranging from 5:1 to 1:5, or 4:1 to 1:1, or 3:1 to 1:1, or 2:1 to 1:1. For instance, the PVP K30:PVP K90 weight ratio may be 3:1, or 2:1, or 1.7:1, or 1:1.

Further exemplary nonreactive hydrophilic polymers that may be used in the ink compositions of the invention include, but are not limited to, dextran, poly(ethylene oxide), polyvinyl alcohol (PVA), poly (N-isopropylacrylamide), poly(oligoethylene oxide), polyethylene glycol (PEG), poly (N,N-dimethylaminoethyl acrylate), poly(imine), poly (acrylic acid), or mixtures of two or more thereof.

Preferably the nonreactive hydrophilic polymer has a weight average molecular weight from about 30,000 to about 500,000, or from about 40,000 to about 80,000, or from about 50,000 to about 60,000. Suitable molecular weight ranges may include, for instance, from 40,000 to 500,000, or from 40,000 to 80,000, or from 200,000 to 500,000.

The ink composition may contain a total amount of all nonreactive hydrophilic polymer of at least 1 percent, or at least 2 percent or at least 3 percent, by weight based on the total weight of the ink composition (including solvent). The ink composition may contain a total amount of all nonreactive hydrophilic polymer of 50 percent or less, or 40 percent or less, or 35 percent or less, or 25 percent or less, or 20 percent or less, or 15 percent or less, or 10 percent or less, based on the total weight of the ink composition (including solvent). For instance, the total amount of all nonreactive hydrophilic polymer may range from 1 percent to 40 percent, or from 3 percent to 35 percent.

The ink composition of the invention may contain a binder polymer. The binder polymer may comprise a copolymer formed from at least one hydrophilic monomer comprising functionality selected from the group consisting of hydroxyalkyl, aminoalkyl, and mixtures thereof, at least one silicone-containing macromer; and optionally a silicone-containing monomer.

The binder polymer may be formed from at least one hydrophilic monomer comprising a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N—$C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N—$C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

The binder polymer may be formed from at least one hydrophilic monomer comprising 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

The binder polymer may be formed from a reactive monomer mixture comprising at least one hydrophilic monomer selected from the group consisting of acrylamide, N,N-dimethylacrylamide (DMA), N-vinylpyrrolidone (NVP), N-vinyl acetamide (NVA), N-vinyl N-methyl acetamide (VMA), N-isopropyl acrylamide, polyethylene glycol monoacrylate, polyethylene glycol monomethacrylate, acrylic acid (AA), methacrylic acid (MAA), N-[(ethenyloxy)carbonyl]-β-alanine, 3-acrylamidopropanoic acid (ACA1), 5-acrylamidopropanoic acid (ACA2), 2-(methacryloyloxy)ethyl trimethylammonium chloride (METAC or Q salt), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT); 1-propanaminium, N,N-dimethyl-N-[3-[(1-oxo-2-propen-1-yl)amino]propyl]-3-sulfo-, inner salt (SBT); 3,5-dioxa-8-aza-4-phosphaundec-10-en-1-aminium, 4-hydroxy-N,N,N-trimethyl-9-oxo-, inner salt, 4-oxide (9CI) (PBT), and mixtures thereof.

The binder polymer may be formed from a silicone-containing macromer, preferably in addition to a hydrophilic monomer, such as one or more of the hydrophilic monomers described above. The silicone-containing macromer may comprise one polymerizable functional group selected from the group consisting of (meth)acrylate, (meth)acrylamide, styryl, vinyl, N-vinyl lactam, N-vinylamides, O-vinylethers, O-vinylcarbonates, and O-vinylcarbamates, and may have between about 1 and about 200 divalent disubstituted siloxane repeating units and be terminated with a $C_1$ to $C_8$ linear, branched or cyclic alkyl group.

The silicone-containing macromer may comprise a chemical structure shown in Formula I:

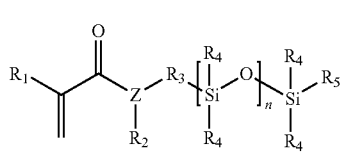

Formula I wherein Z is selected from O, N, S or NCH$_2$CH$_2$O; when Z=O or S, R$_2$ is not required; wherein R$_1$ is a hydrogen atom or methyl; wherein n is a whole number between 1 and 200, or between 1 and 100, or between 1 and 50, or between 1 and 20; wherein R$_3$ is an alkylene segment (CH$_2$)$_y$, in which y is a whole number from 1 to 6, 1 to 4, or 2 to 4, and each methylene group may be optionally further and independently substituted with a group selected from the group consisting of ethers, amines, esters, ketones, carbonyls, carboxylates, and carbamates, or when y is 2 or more a non-terminal methylene group is optionally replaced with a carbamate group; or wherein R$_3$ is an oxyalkylene segment O(CH$_2$)$_z$ in which z is a whole number from 1 to 3, or wherein R$_3$ is a mixture of alkylene and oxyalkylene segments and the sum of y and z is between 1 and 9; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, an alkyl-siloxanylalkyl group, a phenyl group, a benzyl group, a substituted or un-substituted aryl group, a fluoroalkyl group, a partially fluorinated alkyl group, a perfluoroalkyl group, a fluorine atom, a mono-, di, or tri-hydroxyalkyl group containing between one and six carbon atoms, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups.

Non-limiting examples of these silicone-containing macromers include mono-n-alkyl terminated mono-methacryloxypropyl terminated polydimethylsiloxanes as shown in Formula II wherein n is between 3 and 50; between 3 and 25; and between 3 and 15 and R$_5$ is a linear, branched, or cyclic alkyl group containing between 1 and 8 carbon atoms; mono-n-butyl terminated mono-methacryloxypropyl terminated polydimethylsiloxanes (mPDMS) as shown in Formula III wherein n is between 3 and 50; between 3 and 25; or between 3 and 15; and macromers having the chemical structures as shown in Formulae IV through XI, wherein R$_1$ is a hydrogen atom or methyl group; R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and R$_5$ is a linear, branched, or cyclic alkyl group containing between 1 and 8 carbon atoms; and wherein n is between 3 and 50; between 3 and 25; or between 3 and 15.

Formula II
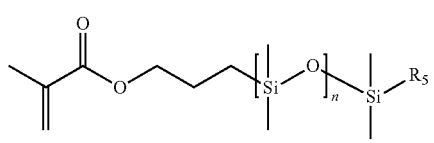

Formula III
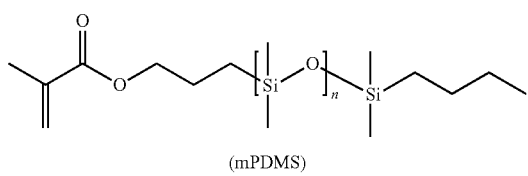
(mPDMS)

Formula IV
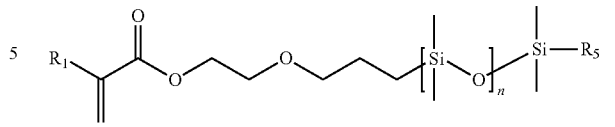

Formula V
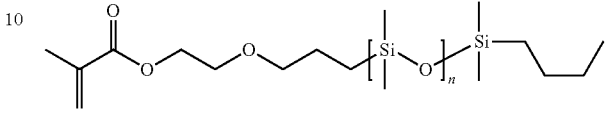

Formula VI
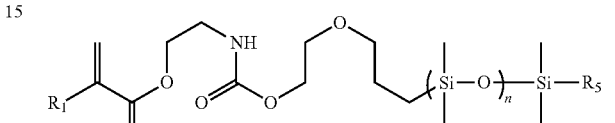

Formula VII
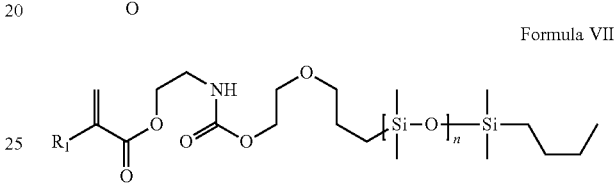

Formula VIII
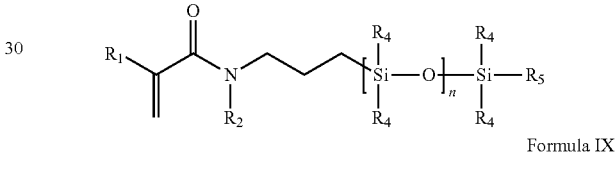

Formula IX
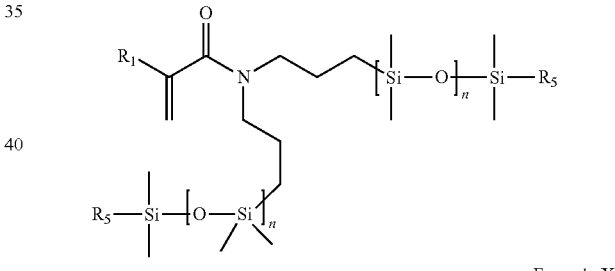

Formula X
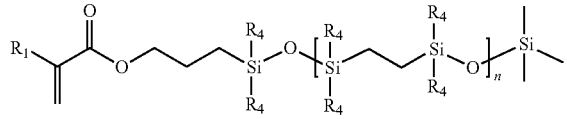

Formula XI

Examples of suitable mono-alkyl terminated mono(meth)acryloxyalkyl terminated polydialkylsiloxanes include mono-n-butyl terminated mono(meth)acryloxypropyl terminated polydimethylsiloxane, mono-n-methyl terminated mono(meth)acryloxypropyl terminated polydimethylsiloxane, mono-n-butyl terminated mono(meth)acryloxypropyl terminated polydiethylsiloxane, mono-n-methyl terminated mono(meth)acryloxypropyl terminated polydiethylsiloxane, mono-alkyl terminated mono(meth)acrylamidoalkyl terminated polydialkylsiloxanes, mono-alkyl terminated mono(meth)acryloxyalkyl terminated polydiarylsiloxanes, and mixtures thereof.

The silicone-containing macromer may comprise a monofunctional hydroxyl-substituted poly(dialkylsiloxane) with a chemical structure shown in Formula XII Formula XII

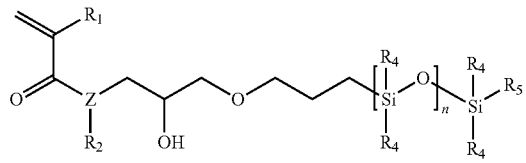

wherein Z is selected from O, N, S or NCH$_2$CH$_2$O; when Z=O or S, R$_2$ is not required; wherein R$_1$ is a hydrogen atom or methyl; wherein n is a whole number between 1 and 200; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups.

Examples of hydroxyl containing macromers include mono-(2-hydroxy-3-methacryloxypropyl)propyl ether terminated mono-n-butyl terminated polydimethylsiloxanes (OH-mPDMS) as shown in Formula XIII wherein n is between 4 and 30; between 4 and 8; or between 10 and 20; and macromers having the chemical structures as shown in Formulae XIV and XV wherein R$_1$ is a hydrogen atom or methyl group; wherein n between 4 and 30; between 4 and 8; or between 10 and 20; wherein R$_4$ is independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups.

Formula XIII

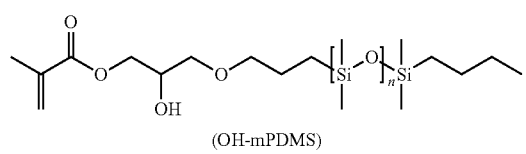

(OH-mPDMS)

Formula XIV

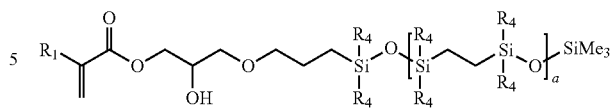

Formula XV

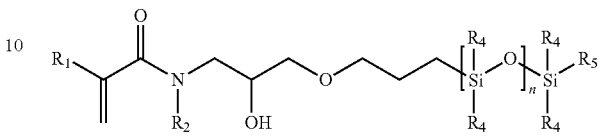

The silicone-containing macromer may comprise the chemical structure shown in Formula XVI.

Formula XVI

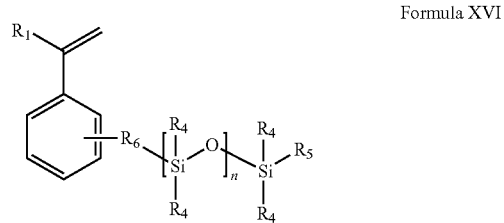

wherein R$_1$ is a hydrogen atom or methyl; wherein n is a whole number between 1 and 200; wherein R$_4$ is independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof wherein R$_5$ is a substituted or un-substituted linear, branched, or cyclic alkyl group having 1 to 8 carbon atoms or an aryl group, any of which may be further substituted with one or more fluorine atoms or trimethylsiloxy groups; and wherein R$_6$ is an alkylene segment (CH$_2$)$_y$, in which y is a whole number from 0 to 6, 0 to 4, and 0 to 2, and each methylene group may be optionally further and independently substituted with a group selected from the group consisting of ethers, amines, alcohols, esters, carbonyls, carboxylates, and carbamates.

The silicone-containing macromer may be a mixture of macromers having the chemical structures shown in Formulae I to XVI.

Preferably, the silicone-containing macromer is selected from the group consisting of monoalkyl terminated, mono (meth)acrylate terminated poly(dialkylsiloxanes), monoalkyl terminated, monoalkyl terminated, mono(meth)acrylate terminated poly(diarylsiloxanes), monoalkyl terminated, mono(meth)acrylate terminated poly(alkylarylsiloxanes), and mixtures thereof.

Most preferably, the silicone-containing macromer is selected from the group consisting of mono-n-butyl terminated monomethacryloxypropyl terminated polydimethylsiloxane (Formula III), mono-n-butyl terminated mono-(2-hydroxy-3-methacryloxypropyl)-propyl ether terminated polydimethylsiloxane (Formula XIII), and mixtures thereof.

The silicone containing macromer may have a number average molecular weight between about 500 Daltons and about 10,000 Daltons, or between about 500 Daltons and about 5,000 Daltons, or between about 500 Daltons and about 2,000 Daltons.

Preferably, the binder polymer is a copolymer of a silicone-containing macromer and a hydrophilic monomer and is comprised of repeating units of the silicone-containing macromer between about 30 and about 80 weight percent; or between about 30 and about 70 weight percent; or between about 40 and about 60 weight percent; or between about 45 and about 55 weight percent; or about 50 weight percent of the copolymer.

The binder polymer may comprise repeating units derived from mono-n-butyl terminated monomethacryloxypropyl terminated polydimethylsiloxane (mPDMS), mono-n-butyl terminated mono-(2-hydroxy-3-methacryloxypropyl)-propyl ether terminated polydimethylsiloxane (OH-mPDMS), and combinations thereof.

Most preferably, the binder polymer comprises repeating units derived from mono-n-butyl terminated monomethacryloxypropyl terminated polydimethylsiloxane (mPDMS) and 2-hydroxyethyl methacrylate (HEMA). Preferably the mPDMS comprises between about 30 and about 80 weight percent; or between about 30 and about 70 weight percent; or between about 40 and about 60 weight percent; or between about 45 and about 55 weight percent; or about 50 weight percent of the copolymer.

The binder polymer may have a weight average molecular weight in the range of about 10 to about 100 kDa; or in the range of about 20 to about 80 kDa; or in the range of about 20 to about 60 kDa; or in the range of about 20 to about 50 kDa.

Preferably, the binder polymer is not a block co- or tri-polymer. Preferably, the binder polymer is a random polymer, such as a random copolymer.

Binder polymers as described herein may be made by methods known to those skilled in the art. For instance, a binder polymer may be formed via any free radical polymerization reaction involving at least two monomers or macromers, regardless of the statistics of the copolymerization, producing a random or statistical or statistically random or graft copolymer. Graft copolymers are formed from macromers when the composition of the macromer's side chains is different than the copolymer's backbone. The copolymer may be blocky based on the statistics of the copolymerization; however, a copolymer that may be legitimately categorized as a diblock or triblock copolymer (e.g., based on known methods of making such diblock and triblock copolymers) are excluded from the definition of copolymer as used in this application.

The ink composition preferably further includes a solvent to facilitate mixing of the components and formation of a cosmetic lens. Suitable solvents include, but are not limited to, ethanol, 1-propanol, 2-propanol, 1-ethoxy-2-propanol (1E2P), t-butyl alcohol, t-amyl alcohol, and 3,7-dimethyl-1,7-octanediol (D30), tripropylene glycol methyl ether (TPME), isopropyl lactate (IPL), 1-(2-hydroxy ethyl)-2-pyrrolidone (HEP), glycerol, or mixtures of two or more thereof. Preferred solvents are 1E2P, IPL, D30, HEP, 1-propanol, or mixtures thereof.

Preferred ink compositions according to the invention comprise: from 0.1 to about 25 weight percent, preferably from about 5 to about 15 weight percent of a colorant; from about 1 to about 50 weight percent, preferably from about 10 to about 40 weight percent, of a nonreactive hydrophilic polymer; from about 1 to 60 weight percent, preferably from about 5 to about 40 weight percent, of the tri-block copolymer; and from about 50 to about 95 weight percent, preferably from about 55 to about 80 weight percent, of solvent, each based on the total weight of the ink composition.

The ink composition may be applied to, or printed on, one or more surfaces of a lens or may be printed onto one or more surfaces of a mold into which a lens forming material will be deposited and cured. In a preferred method for forming cosmetic lenses incorporating the ink composition of the invention, a thermoplastic optical mold, made from any suitable material including, without limitation, cyclic polyolefins and polyolefins such as polypropylene or polystyrene resin is used. The ink composition is deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured. The plate is subsequently washed with an aqueous solution and the resulting image is etched into the plate to a suitable depth, for example about 20 microns. An ink composition is then deposited onto the elements to fill the depressions.

The metal plate can also be laser etched using appropriate software and lasers to extract the metal in the area that contains the preferred image, thus creating cavities replicating the image in 15 um to 30 um depth. Additionally, laser etching of the preferred pattern can occur on other substrates such as ceramic.

A silicon pad of a geometry suitable for use in printing on the surface and varying hardness is pressed against the image on the plate to remove the ink composition. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear coat is first applied to the molding surface and dried prior to the addition of the ink composition. Preferably such clear coat forms the entirety of the lens' outermost surface. The clear coat, may for example, be a the same as the ink composition described herein but without the colorant. Other materials may, however, be used for the clear coat. In addition, multiple layers of clear coat and/or ink composition may be applied to the mold before addition of the lens material, in order to form a desired cosmetic pattern.

The ink composition of the invention may be used to provide colored hard or soft contact lenses made of any known lens-forming material, or material suitable for manufacturing such lenses. Preferably, the lenses of the invention are soft contact lenses, the material selected for forming the lenses being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens is made from a material containing a siloxane functionality, including, without limitation, polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof.

Materials for making soft contact lenses are well known and commercially available. For example, a silicone hydrogel may be made from least one hydrophilic component and at least one silicone-containing component that, when polymerized, form the base material of the lens. Examples of suitable families of hydrophilic components that may be present in the reactive mixture from the which the lens is formed include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof. Silicone-containing components are well known and have been extensively described in the patent literature. For instance, the silicone-containing component may comprise at least one polymerizable group (e.g., a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing), at least one siloxane group, and one or more linking groups connecting the polymerizable group(s) to the siloxane group(s). The silicone-containing components may, for instance, contain from 1 to 220 siloxane repeat units. The silicone-containing component may also contain at least one fluorine atom.

By way of further example, the lens material may be any of acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, US 2010/0048847, and U.S. application Ser. No. 15/691,829. In another embodiment, the lens may be made from a conventional hydrogel material, for example, etafilcon, genfilcon, hilafilcon, lenefilcon, nelfilcon, nesofilcon, ocufilcon, omafilcon, polymacon, and vifilcon, including all of their variants.

A preferred composition for the lens material comprises: a hydrophilic component selected from N, N-dimethylacrylamide ("DMA"), 2-hydroxyethyl methacrylate ("HEMA"), and mixtures thereof; a silicone-containing component selected from 2-hydroxy-3-[3-methyl-3,3-di(trimethylsiloxy)silylpropoxy]-propyl methacrylate (SiMAA), mono-methacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof; an internal wetting agent (preferably a polyamide such as poly(N-vinylpyrrolidone) (PVP), poly(N,N-dimethylacrylamide) (PDMA), or polyvinylmethyacetamide (PVMA)); and a free radical initiator. For the hydrophilic component, mixtures of DMA and HEMA are preferred. For the silicone containing component, OH-mPDMS or mixtures of SiMAA and mPDMS are preferred. The composition may contain other ingredients known in the art for making soft contact lenses including, but not limited to, diluents, crosslinkers, light absorbing compounds (e.g., UV or high energy visible light blockers), and the like.

The following non-limiting examples further illustrate the invention.

EXAMPLES

Imaging was used to qualitatively assess the overall quality of a printed pattern in comparison to the desired design ("smear" in the tables); the level of smear was categorized based on severity ("minor, moderate, severe, or none" in the tables). Imaging was also used to assess the degree of roundness and level of distortion of the lenses ("round or out of round (OOR)" in the tables). Unacceptable levels of haze or translucency were also noted by imaging (hazy or none). Images of the silicone hydrogel printed contact lenses were captured using a Nikon SMZ18 stereo microscope with a P2-DBF Fiber diascopic illumination base (1× objective with 0.75-1× magnification). The printed silicone hydrogel contact lenses were placed concave side up into a crystal cell completely filled with borate buffered packing solution. Samples were placed in the viewing window, and the microscope adjusted to focus the image.

The durability of the printed pattern was assessed by rubbing the printed surface with a cotton swab. The test consists of 50 swipes of the lens. Each swipe started at the lens center on the printed surface and then proceeded in a single direction. Each lens was systematically evaluated, swiping in four orthogonal directions. If the pattern stayed intact for 50 such swipes, then it is deemed permanent ("no rub off" in the tables). Otherwise, if any portion of the printed pattern is dislodged, disturbed, or removed during the 50 swipes, then the pattern was deemed to rub off ("rubs off" in the tables).

Wettability of lenses was determined using a sessile drop technique using KRUSS DSA-100™ instrument at room temperature and using deionized water as probe solution ("Sessile Drop" in the tables). The lenses to be tested were rinsed in deionized water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface. Typically, three to five lenses were evaluated, and the average contact angle reported. The standard deviations were determined and reported in the tables in parentheses ( ).

The following abbreviations will be used throughout the Examples and have the following meanings:
- L: liter(s)
- mL: milliliter(s)
- equiv. or eq.: equivalent(s)
- kg: kilogram(s)
- g: gram(s)
- mg: milligram(s)
- mol: mole
- mmol: millimole
- min: minute(s)
- cm: centimeter(s)
- nm: nanometer(s)
- rpm: revolutions per minute
- Da: dalton or grams/mole
- kDa: kilodalton or an atomic mass unit equal to 1,000 daltons
- wt. %: weight percent
- TL03 lights: Phillips TLK 40 W/03 bulbs
- BC: base curve plastic mold
- FC: front curve plastic mold
- PP: polypropylene which is the homopolymer of propylene and is used as a plastic mold resin or component
- TT: Tuftec which is a hydrogenated styrene butadiene block copolymer (Asahi Kasei Chemicals) and is used as a plastic mold resin or component
- Z: Zeonor which is a polycycloolefin thermoplastic polymer (Nippon Zeon Co Ltd) and is used as a plastic mold resin or component
- RMM: reactive monomer mixture(s)
- DMA: N, N-dimethylacrylamide (Jarchem)
- NVP: N-vinylpyrollidone
- HEMA: 2-hydroxyethyl methacrylate (Bimax)
- PVP, PVP K30, PVP K60, PVP K90: poly(N-vinylpyrrolidone) (ISP Ashland)
- TEGDMA: tetraethylene glycol dimethacrylate (Esstech)
- Omnirad 1870: blend of bis(2,6-dimethoxybenzoyl)-2,4,4-trimethyl-pentylphosphineoxide and mPDMS: mono-n-butyl terminated monomethacryloxypropyl terminated polydimethylsiloxane ($M_n$=800-1500 daltons) (Gelest)
- SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray) or 3-(3-(1,1,1,3,5,5,5-heptamethyltrisiloxan-3-yl)propoxy)-2-hydroxypropyl methacrylate
- Norbloc: 2-(2'-hydroxy-5-methacrylyloxyethylphenyl)-2H-benzotriazole (Janssen)
- Blue HEMA: 1-amino-4-[3-[4-(2-methacryloyloxyethoxy)-6-chlorotriazin-2-ylamino)-4-sulfophenylamino]anthraquinone-2-sulfonic acid, as described in U.S. Pat. No. 5,944,853 Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.
- AIBN: azobisisobutyronitrile
- FTIR: Fourier Transform Infrared Spectroscopy
- DCA: Dynamic Contact Angle wettability
- DIW: deionized water
- IPA: isopropyl alcohol
- THF: tetrahydrofuran
- D3O: 3,7-dimethyl-3-octanol (Vigon)
- 1E2P: 1-ethoxy-2-propanol
- 3E3P: 3-ethyl 3-pentanol
- HEP: 1-(2-hydroxyethyl)-2-pyrrolidone
- IPL: isopropyl lactate Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.

Preparation 1

An AIBN solution was prepared by dissolving 4 grams of AIBN in 300 grams of 1-propanol. The AIBN solution was deaerated with nitrogen gas for 15-20 minutes prior to its use. A monomer solution was prepared by dissolving 98 grams of HEMA and 98 grams of mPDMS in 91 grams of 1-propanol. The monomer solution was deaerated with nitrogen gas for 15-20 minutes prior to its use.

A two-liter jacketed reactor containing 279 grams of 1-propanol was heated to 70° C. under a nitrogen gas atmosphere using a water bath. Using a Watson-Marlow pump, the AIBN and monomer solutions were added to the reactor over four hours. The reaction mixture was stirred overnight after which the temperature was reduced to 50° C., and monomer conversion was monitored by FTIR until the carbon-carbon double bond band disappeared. Complete conversion required about 24 hours.

The reaction mixture was transferred into a clear glass jar. The copolymer was isolated by precipitation into water, suction filtration, and vacuum drying to obtain about 182 grams of product (Copolymer #1).

Example 1

Ink compositions 1A-1D were prepared by adding 9 weight percent black iron oxide pigment (Sicovit® black 85 E 172, Rockwood Italia SpA-Divisione Silo) to the clear coat solutions listed in Table 1. The inks were mixed using a bench-scale ball mill (Ultra-Turrax® Tube Drive (UTTD) System, IKA). In addition, inks may be further manually mixed using a jar roller or use of an overhead mixer at 700-1800 rpm for 30 minutes.

TABLE 1

| Component | Clear Coat 1A (weight %) | Clear Coat 1B (weight %) | Clear Coat 1C (weight %) | Clear Coat 1D (weight %) |
|---|---|---|---|---|
| Copolymer #1 | 8.4 | 7.3 | 3 | 3 |
| PVP K60 | 0 | 0 | 5.7 | 6.75 |
| PVP K30 | 19.6 | 14.7 | 23.3 | 20.25 |
| HEP | 0 | 0 | 6.8 | 0 |
| IPL | 36 | 0 | 0 | 0 |
| D3O | 0 | 7.7 | 0 | 23.1 |
| 1E2P | 36 | 70.3 | 61.2 | 46.9 |
| Total | 100 | 100 | 100 | 100 |

Example 2

Front curve molds were printed using a laboratory scale pad printer first with a clear coating (Clear Coats 1A-1D) and then with a Vivid® cliché pattern using Inks 1A-1D. These printed front curve molds were degassed for at least 12 hours under nitrogen. Printed contact lenses were fabricated in a glove box wherein the oxygen gas level was maintained between 0.5 and 5%. About 100 microliters of RMM #1 listed in Table 2 were dosed into the printed front curve molds at ambient temperature. The time between dosing RMM #1 and placing the BC is termed "Dwell 1."

The nominal Dwell 1 time was not more than 5 seconds unless noted otherwise. The base curve molds were then placed over the RMM #1. Next, a clear quartz plate was placed on top of the mold assemblies. The pallets containing the mold assemblies were then moved into the curing chamber at 60-70° C. The time between placing the weight and starting cure is termed "Dwell 2." The nominal Dwell 2 was not less than 5 minutes unless noted otherwise. Cure is started via irradiation of the pallets containing the mold assemblies with TL 20 W/03 T fluorescent bulbs (Philips) and positioned to achieve an intensity of 4.0 mW/cm² for 8 minutes.

TABLE 2

| Component | Weight Percent |
| --- | --- |
| mPDMS | 28 |
| SIMAA | 31 |
| DMA | 22.6 |
| HEMA | 6 |
| PVP K90 | 9 |
| TEGDMA | 1.25 |
| Norbloc | 1.8 |
| Blue HEMA | 0.02 |
| OmniRad 1870 | 0.33 |
| Σ Reactive Components | 100 |

The final reactive monomer mixture RMM#1 was prepared by combining the component mixture listed above with D3O diluent to make a solution comprised of 77 weight percent reactive components and 23 weight percent D3O diluent.

The printed lenses were manually de-molded with most lenses adhering to the FC and released by submerging the lenses in 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The lenses were transferred into vials and subsequently sterilized by autoclaving at 122° C. for 30 minutes. The sterile printed lenses (2A-2D, made from ink compositions 1A-1D respectively) were evaluated for haze, smear, durability, and shape, and the results listed in Table 3 [Dwell 1=5 seconds; Dwell 2=300 seconds].

TABLE 3

| Test | Printed Lens 2A (weight %) | Printed Lens 2B (weight %) | Printed Lens 2C (weight %) | Printed Lens 2D (weight %) |
| --- | --- | --- | --- | --- |
| Haze | None | None | None | None |
| Smear | None | None | Moderate | Minor |
| Durability | Rubs Off | No Rub Off | No Rub Off | No Rub Off |
| Shape | Round | Round | Round | Round |
| Sessile Drop | — | — | 78 (11.0) | 78 (3.0) |

As shown in Table 3, printed lenses 2B and 2D were transparent and round and exhibited no print rub off with only minor or no smear. Printed lens 2D was also wettable.

Example 3

Ink compositions 3A-3C were prepared by adding 9 weight percent black iron oxide pigment (Sicovit® black 85 E 172, Rockwood Italia SpA-Divisione Silo) to the clear coat solutions listed in Table 4. The inks were mixed using a bench-scale ball mill (Ultra-Turrax® Tube Drive (UTTD) System, IKA). In addition, inks may be further manually mixed using a jar roller or use of an overhead mixer at 700-1800 rpm for 30 minutes.

TABLE 4

| Component | Clear Coat 3A (weight %) | Clear Coat 3B (weight %) | Clear Coat 3C (weight %) |
| --- | --- | --- | --- |
| Copolymer #1 | 3 | 3 | 6.0 |
| PVP K60 | 5.7 | 6.75 | 7.75 |
| PVP K30 | 23.3 | 20.25 | 13.25 |
| HEP | 6.8 | 0 | 14.0 |
| IPL | 0 | 0 | 38 |
| D3O | 0 | 23.1 | 0 |
| 1E2P | 61.2 | 46.9 | 16.0 |
| 1-Propanol | 0 | 0 | 5 |
| Total | 100 | 100 | 100 |

Example 4

Front curve molds were printed using a laboratory scale pad printer first with a clear coating (Clear Coats 3A-3C) and then with a Vivid® cliché pattern using Inks 3A-3C. These printed front curve molds were degassed for at least 12 hours under nitrogen. Printed contact lenses were fabricated in a glove box wherein the oxygen gas level was maintained between 0.5 and 5%. About 100 microliters of RMM #1 listed in Table 2 were dosed into the printed front curve molds at ambient temperature. The time between dosing RMM #1 and placing the BC is termed "Dwell 1." The nominal Dwell 1 time was not more than 5 seconds unless noted otherwise. The base curve molds were then placed over the RMM #1. Next, a clear quartz plate was placed on top of the mold assemblies. The pallets containing the mold assemblies were then moved into the curing chamber at 60-70° C. The time between placing the weight and starting cure is termed "Dwell 2." The nominal Dwell 2 was not less than 5 minutes unless noted otherwise. Cure is started via irradiation of the pallets containing the mold assemblies with TL 20 W/03 T fluorescent bulbs (Philips) and positioned to achieve an intensity of 4.0 mW/cm² for 8 minutes.

The printed lenses were manually de-molded with most lenses adhering to the FC and released by submerging the lenses in 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The lenses were transferred into vials and subsequently sterilized by autoclaving at 122° C. for 30 minutes. The sterile printed lenses (4A-4C, made from ink compositions 3A-3C respectively) were evaluated for haze, smear, durability, and shape, and the results listed in Table 5 [Dwell 1=5 seconds; Dwell 2=300 seconds].

TABLE 5

| Test | Printed Lens 4A (weight %) | Printed Lens 4B (weight %) | Printed Lens 4C (weight %) |
|---|---|---|---|
| Haze | None | None | None |
| Smear | Moderate | Minor | None |
| Durability | No Rub Off | No Rub Off | No Rub Off |
| Shape | Round | Round | Round |
| Sessile Drop | 78 (11.1) | 77.7 (2.9) | 93 (10) |

As shown in Table 5, printed lenses 4B and 4C were transparent and round and exhibited no print rub off with only minor or no smear. Printed lens 4B was also wettable.

Example 5

Ink compositions 5A-5D were prepared by adding 9 weight percent black iron oxide pigment (Sicovit® black 85 E 172, Rockwood Italia SpA-Divisione Silo) to the clear coat solutions listed in Table 6. The inks were mixed using a bench-scale ball mill (Ultra-Turrax® Tube Drive (UTTD) System, IKA). In addition, inks may be further manually mixed using a jar roller or use of an overhead mixer at 700-1800 rpm for 30 minutes.

TABLE 6

| Component | Clear Coat 5A (weight %) | Clear Coat 5B (weight %) | Clear Coat 5C (weight %) | Clear Coat 5D (weight %) |
|---|---|---|---|---|
| PVP K60 | 10 | 8 | 8 | 8.75 |
| PVP K30 | 19 | 24 | 24 | 26.25 |
| HEP | 0 | 0 | 0 | 6.5 |
| IPL | 0 | 51 | 17 | 0 |
| D30 | 7 | 0 | 0 | 0 |
| 1E2P | 64 | 17 | 51 | 58.5 |
| Total | 100 | 100 | 100 | 100 |

Example 6

Front curve molds were printed using a laboratory scale pad printer first with a clear coating (Clear Coats 5A-5D) and then with a Vivid® cliché pattern using Inks 5A-5D. These printed front curve molds were degassed for at least 12 hours under nitrogen. Printed contact lenses were fabricated in a glove box wherein the oxygen gas level was maintained between 0.5 and 5%. About 100 microliters of RMM #1 listed in Table 2 were dosed into the printed front curve molds at ambient temperature. The time between dosing RMM #1 and placing the BC is termed "Dwell 1." The nominal Dwell 1 time was not more than 5 seconds unless noted otherwise. The base curve molds were then placed over the RMM #1. Next, a clear quartz plate was placed on top of the mold assemblies. The pallets containing the mold assemblies were then moved into the curing chamber at 60-70° C. The time between placing the weight and starting cure is termed "Dwell 2." The nominal Dwell 2 was not less than 5 minutes unless noted otherwise. Cure is started via irradiation of the pallets containing the mold assemblies with TL 20 W/03 T fluorescent bulbs (Philips) and positioned to achieve an intensity of 4.0 mW/cm$^2$ for 8 minutes.

The printed lenses were manually de-molded with most lenses adhering to the FC and released by submerging the lenses in 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The lenses were transferred into vials and subsequently sterilized by autoclaving at 122° C. for 30 minutes. The sterile printed lenses (6A-6D, made from ink compositions 5A-5D respectively) were evaluated for haze, smear, durability, and shape, and the results listed in Table 7 [Dwell 1=5 seconds; Dwell 2=300 seconds].

TABLE 7

| Test | Printed Lens 6A (weight %) | Printed Lens 6B (weight %) | Printed Lens 6C (weight %) | Printed Lens 6D (weight %) |
|---|---|---|---|---|
| Haze | None | None | None | None |
| Smear | Severe | Moderate | Minor | Minor |
| Durability | No Rub Off | No Rub Off | No Rub Off | No Rub Off |
| Shape | Round | Round | Round | Round |
| Sessile Drop | 89 (7.1) | 69 (15.2) | 70 (38.8) | 61.5 (3.2) |

As shown in Table 7, printed lenses 6C and 6D were transparent and round and exhibited no print rub off with only minor smear. Printed lenses 6C and 6D were also wettable.

Example 7

Ink composition 7A was prepared by adding 9 weight percent black iron oxide pigment (Sicovit® black 85 E 172, Rockwood Italia SpA-Divisione Silo) to the clear coat solutions listed in Table 8. Ink set compositions 7B were prepared by adding a combination of black, blue, and white pigments at various concentrations between 3.8-9.0 weight percent, to the clear coat solutions listed in Table 8 to create a set of 3 colored inks. The Set of 3 inks were used to create one cosmetic ink design for printed lens 7B. The inks were mixed using a bench-scale ball mill (Ultra-Turrax® Tube Drive (UTTD) System, IKA). In addition, inks may be further manually mixed using a jar roller or use of an overhead mixer at 700-1800 rpm for 30 minutes.

TABLE 8

| Component | Clear Coat 7A (weight %) | Clear Coat 7B (weight %) |
|---|---|---|
| PVP K60 | 8.0 | 15.0 |
| PVP K30 | 14.0 | 0 |
| Binding Polymer | 6.0 | 5.0 |
| Glycerol | 0 | 1.0 |
| HEP | 10.0 | 6.0 |
| IPL | 25.0 | 13.0 |
| IE2P | 37.0 | 60.0 |
| Total | 100 | 100 |

Front curve molds were printed using a pad printer first with a clear coating (Clear Coats 7A and 7B) and then with cliché patterns using Inks 7A or 7B. Printed contact lenses were fabricated in a pilot facility production line wherein the oxygen gas level was maintained between 0.5 and 5%. About 100 microliters of RMM #2 listed in Table 9 were dosed into the printed front curve molds at ambient temperature. The time between dosing RMM #2 and placing the BC is termed "Dwell 1." The nominal Dwell 1 time was not more than 5 seconds unless noted otherwise. The base curve molds were then placed over the RMM #2. Next, precure weights were placed on top of the mold assemblies. The pallets containing the mold assemblies were then moved into the heated precure tunnel at 30° C. The time between placing the weight and starting cure is termed "Dwell 2." The nominal Dwell 2 was not less than 5 minutes unless noted otherwise. Cure is started via irradiation of the pallets containing the mold assemblies with TL 20 W/03 T fluorescent bulbs (Philips) and positioned to achieve an intensity of 4.0 mW/cm² for 8 minutes.

TABLE 9

| Component | RMM#2 Weight Percent |
|---|---|
| mPDMS | 31.0 |
| SIMAA | 28.0 |
| DMA | 24.0 |
| HEMA | 5.85 |
| PVP K90 | 7 |
| TEGDMA | 1.66 |
| Norbloc | 2.0 |
| Blue HEMA | 0.02 |
| OmniRad 184 | 0.14 |
| OmniRad 1870 | 0.34 |
| Σ Reactive Components | 100 |

The final reactive monomer mixture RMM#2 was prepared by combining the component mixture listed above with D3O diluent to make a solution comprised of 77 weight percent reactive components and 23 weight percent D3O diluent.

The printed lenses were de-molded with most lenses adhering to the FC and released by submerging the lenses in 70 percent IPA for about one or two hours, followed by washing two times with 70 percent IPA, optionally two times with 25 percent IPA, two times with DI, and finally once with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The lenses were inspected and packaged in heat sealed blisters and subsequently sterilized by autoclaving at 121° C. for 18 minutes. The sterile printed lenses (7A-7B, made from ink compositions 7A-7B respectively) were evaluated for haze, smear, durability, shape, and wettability and the results listed in Table 3 (Dwell 1=5 seconds; Dwell 2=300 seconds).

TABLE 10

| Test | Printed Lens 7A | Printed Lens 7B |
|---|---|---|
| Colored layers | 1 | 3 |
| Haze | None | None |
| Smear | None | None |
| Durability | No Rub Off | No Rub Off |
| Shape | Round | Round |
| DCA | 60(10) | 64(17) |
| Sessile Drop | 77.1 (7) | 97.9 (8) |

As shown in Table 10, printed lenses 7A and 7B were transparent, round, exhibited no print rub off or smear, and were wettable.

Example 8

Ink set compositions 8A were prepared by adding a combination of black, blue, and white pigments at various concentrations between 3.8-9.0 weight percent, to the Ink Base solutions listed in Table 8 to create a set of 3 colored inks. The Set of 3 inks were used to create one cosmetic ink design for printed lens 8A. The inks were mixed using a bench-scale ball mill (Ultra-Turrax® Tube Drive (UTTD) System, IKA). In addition, inks may be further manually mixed using a jar roller or use of an overhead mixer at 700-1800 rpm for 30 minutes.

TABLE 11

| Component | Ink Base 8A |
|---|---|
| PVP K60 | 0 |
| PVP K30 | 22.5 |
| Binding Polymer | 7.5 |
| Glycerol | 1 |
| HEP | 0 |
| IPL | 24.0 |
| 1E2P | 45.0 |
| Total | 100 |

Front curve molds were printed using a pad printer first with a clear coating (Clear Coat 7B from example 7) and then with cliché patterns using Ink set 8A. Printed contact lenses were fabricated on a pilot facility production line wherein the oxygen gas level was maintained between 0.5 and 5%. About 100 microliters of RMM #2 listed in Table 9 were dosed into the printed front curve molds at ambient temperature. The time between dosing RMM #2 and placing the BC is termed "Dwell 1." The nominal Dwell 1 time was not more than 5 seconds unless noted otherwise. The base curve molds were then placed over the RMM #2. Next, precure weights were placed on top of the mold assemblies. The pallets containing the mold assemblies were then moved into the heated precure tunnel at 30° C. The time between placing the weight and starting cure is termed "Dwell 2." The nominal Dwell 2 was not less than 5 minutes unless noted otherwise. Cure is started via irradiation of the pallets containing the mold assemblies with TL 20 W/03 T fluorescent bulbs (Philips) and positioned to achieve an intensity of 4.0 mW/cm² for 8 minutes.

The printed lenses were de-molded with most lenses adhering to the FC and released by submerging the lenses in 70 percent IPA for about one or two hours, followed by washing two times with 70 percent IPA, optionally two times with 25 percent IPA, two times with DI, and finally once with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The lenses were inspected and packaged in heat sealed blisters and subsequently sterilized by autoclaving at 121° C. for 18 minutes. The sterile printed lenses (78A, made from clear coat 7B and ink composition set 8A respectively) were evaluated for haze, smear, durability, shape, and wettability and the results listed in Table 3 (Dwell 1=5 seconds; Dwell 2=300 seconds).

TABLE 12

| Test | Printed Lens 8A |
|---|---|
| Colored layers | 3 |
| Haze | None |
| Smear | None |
| Durability | No Rub Off |
| Shape | Round |
| DCA | 50(6) |
| Sessile Drop | 100(11) |

As shown in Table 12, printed lenses 8A using dissimilar ink layer compositions, were transparent, round, exhibited no print rub off or smear, and were wettable.

We claim:

1. A cosmetic contact lens comprising: a contact lens having applied thereon an ink composition, the ink composition comprising: (a) a colorant; (b) a nonreactive hydrophilic polymer; and (c) a binder polymer, wherein the binder polymer comprises a copolymer formed from (i) a hydrophilic monomer comprising functionality selected from the group consisting of hydroxyalkyl, aminoalkyl, and mixtures thereof; and (ii) a silicone-containing macromer.

2. The cosmetic contact lens of claim 1 wherein the nonreactive hydrophilic polymer comprises a polyamide.

3. The cosmetic contact lens of claim 1 wherein the nonreactive hydrophilic polymer comprises: dextran, poly (ethylene oxide), polyvinyl alcohol (PVA), poly (N-isopropylacrylamide), poly(oligoethylene oxide), polyethylene glycol (PEG), poly (N,N-dimethylaminoethyl acrylate), poly(imine), poly(acrylic acid), or mixtures of two or more thereof.

4. The cosmetic contact lens of claim 1, further comprising (d) a solvent.

5. The cosmetic contact lens of claim 4 wherein the solvent comprises: ethanol, 1-propanol, 2-propanol, 1-ethoxy-2-propanol (1E2P), t-butyl alcohol, t-amyl alcohol, and 3,7-dimethyl-1,7-octanediol (D30), tripropylene glycol methyl ether (TPME), isopropyl lactate (IPL), 1-(2-hydroxy ethyl)-2-pyrrolidone (HEP), glycerol or mixtures of two or more thereof.

6. The cosmetic contact lens of claim 1 wherein the nonreactive hydrophilic polymer comprises a cyclic polyamide.

7. The cosmetic contact lens of claim 1 wherein the colorant comprises: pthalocyanine blue, pthalocyanine green, carbazole violet, vat orange #1, iron oxide black, iron oxide brown, iron oxide yellow, iron oxide red, titanium dioxide, dichlorotriazine, vinyl sulfone-based dyes, and mixtures of two or more thereof.

8. The cosmetic contact lens of claim 1 wherein the ink composition comprises: from 0.1 to about 25 weight percent of the colorant; from about 1 to about 50 weight percent of the nonreactive hydrophilic polymer; from about 1 to 60 weight percent of the binder polymer; and from about 50 to about 95 weight percent of a solvent, each based on the total weight of the ink composition.

9. The cosmetic contact lens of claim 1 wherein the binder polymer has a weight average molecular weight in the range of about 10 to about 100 kDa.

10. The cosmetic contact lens of claim 1 wherein the nonreactive hydrophilic polymer is poly(vinylpyrrolidone).

11. The cosmetic contact lens of claim 1, wherein the hydrophilic monomer comprises 2-hydroxyethyl (meth) acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth) acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

12. The cosmetic contact lens of claim 11, wherein the hydrophilic monomer is 2-hydroxyethyl (meth)acrylate.

13. The cosmetic contact lens of claim 1 wherein the silicone-containing macromer comprises a polymerizable functional group selected from the group consisting of (meth)acrylate, (meth)acrylamide, styryl, vinyl, N-vinyl lactam, N-vinylamides, O-vinylethers, O-vinylcarbonates, and O-vinylcarbonates.

14. The cosmetic contact lens of claim 1, wherein the silicone-containing macromer comprises a chemical structure shown in Formula I:

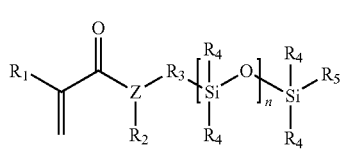

Formula I wherein Z is selected from O, N, S or NCH$_2$CH$_2$O; when Z=O or S, R$_2$ is not required; wherein R$_1$ is a hydrogen atom or methyl; wherein n is a whole number between 1 and 200; wherein R$_3$ is an alkylene segment (CH$_2$)$_y$, in which y is a whole number from 1 to 6, and each methylene group may be optionally further and independently substituted with a group selected from the group consisting of ethers, amines, esters, ketones, carbonyls, carboxylates, and carbamates, or when y is 2 or more a non-terminal methylene group is optionally replaced with a carbamate group; or wherein R$_3$ is an oxyalkylene segment O(CH$_2$)$_z$ in which z is a whole number from 1 to 3, or wherein R$_3$ is a mixture of alkylene and oxyalkylene segments and the sum of y and z is between 1 and 9; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, an alkyl-siloxanyl-alkyl group, a phenyl group, a benzyl group, a substituted or un-substituted aryl group, a fluoroalkyl group, a partially fluorinated alkyl group, a perfluoroalkyl group, a fluorine atom, a mono-, di, or tri-hydroxyalkyl group containing between one and six carbon atoms, or combinations thereof; and wherein R₅ is a substituted or un-substituted linear, branched, or cyclic alkyl group having 1 to 8 carbon atoms or an aryl group, any of which may be further substituted with one or more fluorine atoms or trimethylsiloxy groups.

15. The cosmetic contact lens of claim 1, wherein the silicone-containing macromer is selected from the group consisting of monoalkyl terminated, mono(meth)acrylate terminated poly(dialkylsiloxanes), monoalkyl terminated, monoalkyl terminated, mono(meth)acrylate terminated poly(diarylsiloxanes), monoalkyl terminated, mono(meth)acrylate terminated poly(alkylarylsiloxanes), and mixtures thereof.

16. The cosmetic contact lens of claim 15, wherein the silicone-containing macromer is mono-n-butyl terminated monomethacryloxypropyl terminated polydimethylsiloxane.

17. The cosmetic contact lens of claim 1, wherein the silicone-containing macromer comprises a chemical structure shown in Formula VIII:

Formula VIII

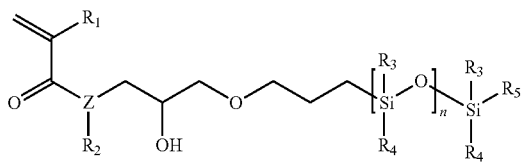

wherein Z is selected from O, N, S or NCH₂CH₂O; wherein R₁ is independently hydrogen atom or methyl group; wherein R₂, R₃, and R₄ are independently a hydrogen atom or a linear, branched, or cyclic alkyl group containing one to eight carbon atoms, any of which may be further substituted with at least one hydroxy group, and which may be optionally substituted with amido, ether, amino, carboxyl, carbonyl groups and combinations thereof; for Z=O and S, R₂ is not required; wherein n is the number of siloxane repeating units and is from 4 to 200; and wherein R₅ is selected from straight or branched C₁ to C₈ alkyl groups.

18. The cosmetic contact lens of claim 1, wherein the silicone-containing macromer is mono-n-butyl terminated mono-(2-hydroxy-3-methacryloxypropyl)-propyl ether terminated polydimethylsiloxane.

19. The cosmetic contact lens of claim 1, wherein the silicone-containing macromer is selected from the group consisting of mono-n-butyl terminated monomethacryloxypropyl terminated polydimethylsiloxane, mono-n-butyl terminated mono-(2-hydroxy-3-methacryloxypropyl)-propyl ether terminated polydimethylsiloxane, and mixtures thereof.

20. The cosmetic contact lens of claim 1, wherein the silicone-containing macromer has a number average molecular weight greater than 500 Daltons.

21. The cosmetic contact lens of claim 1, wherein the silicone-containing macromer has a number average molecular weight between about 500 Daltons and about 20,000 Daltons.

22. The cosmetic contact lens of claim 1, wherein the repeating units of the silicone-containing macromer are present in the range of about 30 and about 80 weight percent of the total weight of the binder polymer.

23. The cosmetic contact lens of claim 1, wherein the binder polymer comprises a copolymer formed from (i) a hydrophilic monomer comprising functionality selected from the group consisting of hydroxyalkyl, aminoalkyl, and mixtures thereof; (ii) a silicone-containing macromer; and (iii) a silicone-containing monomer that is selected from the group consisting of: 3-methacryloxypropyl tris(trimethylsiloxy)silane, 3-acryloxypropyl tris(trimethylsiloxy)silane, 3-methacrylamidopropyl tris(trimethylsiloxy)silane, 3-acrylamidopropyl tris(trimethylsiloxy)silane, tris(trimethylsiloxy)silyl styrene, 2-methyl-2-hydroxy-3-[3-[1,3,3,3-tetramethyl-1-[(trimethylsilyl)oxy]disiloxanyl]propoxy]propyl ester, N-(2,3-dihydroxylpropyl)N-(3-tetra(dimethylsiloxy) dimethylbutylsilane)propyl) acrylamide and mixtures thereof.

24. The cosmetic contact lens of claim 1 that is a cosmetic silicone hydrogel contact lens.

25. The cosmetic contact lens of claim 24 further comprising an internal wetting agent.

26. The cosmetic contact lens of claim 1 wherein the lens comprises multiple layers of ink composition wherein the multiple layers of ink composition may be the same or different.

27. The cosmetic contact lens of claim 1 further comprising an ink layer that is free of nonreactive hydrophilic polymer.

28. A method for making a cosmetic contact lens, the method comprising: (i) applying a clear coat to a lens forming surface of a first lens forming mold; (ii) applying to the clear coat an ink composition comprising: (a) a colorant; (b) a nonreactive hydrophilic polymer; and (c) a binder polymer, wherein the binder polymer comprises a copolymer formed from a hydrophilic monomer comprising functionality selected from the group consisting of hydroxyalkyl, aminoalkyl, and mixtures thereof; and a silicone-containing macromer; (iii) dispensing a lens material to the first lens forming mold; (iv) applying a second lens forming mold; and (v) curing the lens material to form the cosmetic contact lens.

* * * * *

UNITED STATES PATENT AND TRADEMARK OFFICE
CERTIFICATE OF CORRECTION

| | | |
|---|---|---|
| PATENT NO. | : 11,891,526 B2 | Page 1 of 1 |
| APPLICATION NO. | : 16/987673 | |
| DATED | : February 6, 2024 | |
| INVENTOR(S) | : Patton et al. | |

It is certified that error appears in the above-identified patent and that said Letters Patent is hereby corrected as shown below:

In the Claims

Claim 5, Column 23, Line 53:
Correct: ". . . (D30) . . ."
To read: -- . . . (D3O) . . . --

Signed and Sealed this
Twelfth Day of March, 2024

*Katherine Kelly Vidal*

Katherine Kelly Vidal
*Director of the United States Patent and Trademark Office*